US005978594A

United States Patent [19]
Bonnell et al.

[11] Patent Number: 5,978,594
[45] Date of Patent: Nov. 2, 1999

[54] SYSTEM FOR MANAGING COMPUTER RESOURCES ACROSS A DISTRIBUTED COMPUTING ENVIRONMENT BY FIRST READING DISCOVERY INFORMATION ABOUT HOW TO DETERMINE SYSTEM RESOURCES PRESENCE

[75] Inventors: David N. Bonnell, Houston; Kirill L. Tatarinov; Martin W. Picard, both of Bellaire, all of Tex.

[73] Assignee: BMC Software, Inc., Houston, Tex.

[21] Appl. No.: 08/812,860

[22] Filed: Mar. 6, 1997

Related U.S. Application Data

[63] Continuation of application No. 08/316,034, Sep. 30, 1994, abandoned.

[51] Int. Cl.[6] .................................................. G06F 13/10
[52] U.S. Cl. ........................................ 395/837; 395/825
[58] Field of Search ..................... 395/200.53, 200.54, 395/500, 712, 825, 837; 364/242

[56] References Cited

U.S. PATENT DOCUMENTS

| 4,780,821 | 10/1988 | Crossley .................................. 364/200 |
| 4,866,664 | 9/1989 | Burkhardt, Jr. et al. ............... 364/900 |
| 4,924,378 | 5/1990 | Hershey et al. ......................... 364/200 |
| 5,062,037 | 10/1991 | Shorter et al. .......................... 364/200 |
| 5,079,695 | 1/1992 | Dysart et al. ............................ 395/700 |
| 5,109,486 | 4/1992 | Seymour .................................. 395/200 |
| 5,129,086 | 7/1992 | Coyle, Jr. et al. ....................... 395/650 |
| 5,142,683 | 8/1992 | Burkhardt, Jr. et al. ............... 395/725 |
| 5,167,035 | 11/1992 | Mann et al. .............................. 395/575 |
| 5,237,684 | 8/1993 | Record et al. ........................... 395/650 |
| 5,291,591 | 3/1994 | Kawano et al. .......................... 395/600 |
| 5,291,597 | 3/1994 | Shorter et al. .......................... 395/650 |
| 5,310,323 | 5/1994 | Maeurer et al. ......................... 395/650 |
| 5,315,711 | 5/1994 | Barone et al. ........................... 395/275 |
| 5,317,742 | 5/1994 | Bapat ....................................... 395/700 |
| 5,367,635 | 11/1994 | Bauer et al. .............................. 395/200 |
| 5,369,570 | 11/1994 | Parad ........................................ 364/401 |
| 5,442,791 | 8/1995 | Wrabetz et al. ......................... 395/650 |
| 5,463,775 | 10/1995 | DeWitt et al. ........................ 395/184.01 |
| 5,471,617 | 11/1995 | Farrand et al. .......................... 395/700 |
| 5,483,468 | 1/1996 | Chen et al. ........................... 364/551.01 |
| 5,491,796 | 2/1996 | Wanderer et al. ................... 395/200.09 |

FOREIGN PATENT DOCUMENTS

| 57146361 | of 0000 | Japan . |
| 60252952 | of 0000 | Japan . |
| 61286959 | of 0000 | Japan . |

OTHER PUBLICATIONS

DDS/Patrol, ver. 1.3 Installation and User's Guide; Patrol Software Pty. Ltd.; Jun. 10, 1993.
Communicating Event Information Between Applications in A Multitasking Environment; IBM Technical Disclosure Bulletin, p. 4832 (Apr., 1987).

(List continued on next page.)

Primary Examiner—Thomas C. Lee
Assistant Examiner—Chien Yuan
Attorney, Agent, or Firm—Jenkens & Gilchrist, P.C.

[57] ABSTRACT

A method and apparatus are disclosed for managing a computer network. A manager software system is installed on a network management computer system within the network, and one agent software system is installed on each of the server computer systems in the network. A knowledge module in the form of a text fie is stored on the network manager computer system so that the manager software system can transmit knowledge to the various agent software systems throughout the network, for use by the agents in monitoring and managing the server on which they are installed. Interpretable script language programs are present on all computers in the network, expanding and customizing the functionality of the agent software systems. A method is disclosed for using the high level interpretable script language programs in connection with the agent software systems for discovering resources on the network, monitoring aspects of resources, and taking recovery actions automatically in the event of an alarm condition.

14 Claims, 11 Drawing Sheets

OTHER PUBLICATIONS

Having a Network Nightmare? Let the Software Take Over, Fisher, Lawrence M.; The New York Times, Sep. 18, 1994; p. F8.

The Simple Book, An Introduction to Internet Management; Rose, Marshall T.; 2d ed.; 1994.

DEC, Development and distribution agreement between DEC and Patrol Software, Oct. 1993.

Graeme, Philip, Developer Down Under Hits Distributed Shore, Software Magazine, v 13 n9, Jun. 199.

Digital Equipment Corp., "Polycenter System Watchdog (V.1.0)", Computer Select, Nov. 1993.

"Automatic System Configuration Determination Program", IBM TDB vol. 13, pp. 2722–2724, Feb. 1971.

Yemini, Yechiam, Netmate: Management of Complex Distributed Networked Systems, IEEE, p. 173, 1991.

Drake, Peter, Using SNMP to Manage Networks, IEEE, pp. 2/1–2/4, 1991.

Kiriha, Yoshiaki, An Automatic Generation of Management INformation Base for OSI based Network Management System, IEEE, pp. 0649–0653, 1991.

Agoulmine, Nazim, A System Architecture for Updating Management INformation in Heterogeneous Networks, IEEE, pp. 999–1003, 1992.

Ahmed M., B–ISDN Customer Network Management Framework, IEEE, pp. 36–41, 1992.

Zhang, Xinxin, X.500 Directory and OSI Management, IEEE, pp. 1106–1110, 1992.

Zhang, Xinxin, Supporting Network Management Through Distributed Directory Service, IEEE, pp. 1000–1010, May 1994.

Wu, Shyhtsun F., EMOSY: An SNMP Protocol Object Generator for the Protocol Independent MIB, IEEE, pp. 133–144, 1994.

O'Mahony, Donal, Security Considerations in a Network Management Enviornment, IEEE, pp. 12–17, 1994.

Leon, Benjamin J. Leon, Network Management Information for System Control, IEEE, pp. 1553–1557, 1993.

Abeck, Sebastian, Implementing OSI and Internet Managed Object Libraries, IEEE, pp. 1197–1201, 1993.

Miyauchi, Naoto, An Implementation of Management Information Base, IEEE, pp. 318–321, 1991.

| 82 | INFORMATION APPLICABLE TO ALL CLASSES OF COMPUTERS<br>· ENVIRONMENT   · COMMANDS<br>· PARAMETER   · SETUP COMMANDS<br>· COMMAND TYPES   · INFOBOX COMMANDS | | | | | | |
|---|---|---|---|---|---|---|---|
| 84 | INFORMATION APPLICABLE TO COMPUTER CLASS 1<br>· ENVIRONMENT<br>· PARAMETERS<br>· COMMAND TYPES<br>· COMMANDS<br>· SETUP COMMANDS<br>· INFOBOX COMMANDS | | | ∘∘∘ | INFORMATION APPLICABLE TO COMPUTER CLASS 'n'<br>· ENVIRONMENT<br>· PARAMETERS<br>· COMMAND TYPES<br>· COMMANDS<br>· SETUP COMMANDS<br>· INFOBOX COMMANDS | | | |
| 86 | INFORMATION APPLICABLE TO COMPUTER INSTANCE 1 IN CLASS 1<br>· ENVIRONMENT<br>· PARAMETERS<br>· COMMANDS<br>· INFOBOX COMMANDS | ∘∘∘ | INFORMATION APPLICABLE TO COMPUTER INSTANCE 'n' IN CLASS 1<br>· ENVIRONMENT<br>· PARAMETERS<br>· COMMANDS<br>· INFOBOX COMMANDS | ∘∘∘ | INFORMATION APPLICABLE TO COMPUTER INSTANCE 1 IN CLASS 'n'<br>· ENVIRONMENT<br>· PARAMETERS<br>· COMMANDS<br>· INFOBOX COMMANDS | ∘∘∘ | INFORMATION APPLICABLE TO COMPUTER INSTANCE 'n' IN CLASS 'n'<br>· ENVIRONMENT<br>· PARAMETERS<br>· COMMANDS<br>· INFOBOX COMMANDS | |
| 88 | INFORMATION APPLICABLE TO APPLICATION CLASS 1<br>· ENVIRONMENT<br>· PARAMETERS<br>· COMMAND TYPES<br>· COMMANDS<br>· INFOBOX COMMANDS<br>· DISCOVERY | | | ∘∘∘ | INFORMATION APPLICABLE TO APPLICATION CLASS 'n'<br>· ENVIRONMENT<br>· PARAMETERS<br>· COMMAND TYPES<br>· COMMANDS<br>· INFOBOX COMMANDS<br>· DISCOVERY | | | |
| 90 | INFORMATION APPLICABLE TO APPLICATION INSTANCE 1 IN CLASS 1<br>· ENVIRONMENT<br>· PARAMETERS<br>· COMMANDS | ∘∘∘ | INFORMATION APPLICABLE TO APPLICATION INSTANCE 'n' IN CLASS 1<br>· ENVIRONMENT<br>· PARAMETERS<br>· COMMANDS | ∘∘∘ | INFORMATION APPLICABLE TO APPLICATION INSTANCE 1 IN CLASS 'n'<br>· ENVIRONMENT<br>· PARAMETERS<br>· COMMANDS | ∘∘∘ | INFORMATION APPLICABLE TO APPLICATION INSTANCE 'n' IN CLASS 'n'<br>· ENVIRONMENT<br>· PARAMETERS<br>· COMMANDS | |

(92 brackets rows 84 and 86; 94 brackets rows 88 and 90)

```
!PATROLV2.0.21    3973F830585795A8
!++
!
! PATROL Session Knowledge Module
!
!--
VERSION2
COMPUTERS = {                                           FIG. 5a
    { NAME = "ALL_COMPUTERS",
        COMMANDS = {
            { NAME = "Login",
                AVAILABILITY = AVAILABLE_ONLINE,
                SECURITY = SECURITY_INHERIT,
                BASE_COMMAND = {
                        { COMPUTER_TYPE = "ALL_COMPUTERS",
                          COMMAND_TYPE = "OS",
                          COMMAND_TEXT = 769753920 "%{/terminalEmulator} -sl 500 -sb -n %{/ho
                        }
                }
            }
        },
        INFO_BOX = {
            { NAME = "Ip Address",
                AVAILABILITY = AVAILABLE_ONLINE,
                SECURITY = SECURITY_INHERIT,
                BASE_COMMAND = {
                        { COMPUTER_TYPE = "ALL_COMPUTERS",
                          COMMAND_TYPE = "OS",
                          COMMAND_TEXT = 759992599 "%ECHO %{/ipAddress}"
                        }
                }
            }
        },
        SETUP = {
            { NAME = "Terminal Emulater",
                AVAILABILITY = AVAILABLE_ALWAYS,
                SECURITY = SECURITY_INHERIT,
                BASE_COMMAND = {
                        { COMPUTER_TYPE = "ALL_COMPUTERS",
                          COMMAND_TYPE = "PSL",
                          COMMAND_TEXT = 759992599 "set (\"/terminalEmulator\", \"xterm\");"
                        },
                        { COMPUTER_TYPE = "ULTRIX",
                          COMMAND_TYPE = "PSL",
                          COMMAND_TEXT = 759992599 "set (\"terminalEmulator\", \"dxterm\");"
                        }
                }
            }
        },
        ENVIRONMENT = { "PATH" = "/bin:/usr/bin:/etc:/usr/etc:/usr/ucb:/usr/bsd/quota:/usr/sl
        PARAMETERS = {
            { NAME = "PrinterDiscovery",
                PARAM_TYPE = STANDARD,
                ACTIVE = True,
                MONITOR = False,
                CHECK = False,
                BASE_COMMAND = {
                        { COMPUTER_TYPE = "ALL_COMPUTERS",
                          COMMAND_TYPE = "PSL",
                          COMMAND_TEXT = 766297889 "set (\"/prnDiscoveryPollTime\", 300);"
                        }
                },
                START = "ASAP",
                EXECUTION = "1",
```

FIG. 5b

```
        { NAME = "CPU Utilization",
          AVAILABILITY = AVAILABLE_ONLINE,
          SECURITY = SECURITY_INHERIT,
          BASE_COMMAND = {
                { COMPUTER_TYPE = "ALL_COMPUTERS",
                  COMMAND_TYPE = "PSL",
                  COMMAND_TEXT = LOAD "cpu_trend_analysis.psl"
                }
          },
          TASK = {
                SHOW_TIMER = TRUE,
                INTERACTIVE = FALSE,
                ATTN_POPUP = TRUE
          }
        }
      }
    },
    INFO_BOX = {
       { NAME = "System Load",
         AVAILABILITY = AVAILABLE_ONLINE,
         SECURITY = SECURITY_INHERIT,
         BASE_COMMAND = {
               { COMPUTER_TYPE = "ALL_COMPUTERS",
                 COMMAND_TYPE = "PSL",
                 COMMAND_TEXT = 759992618 "print (get (\"/SYSTEM/SYSTEM/uptLoad\"))
               }
         }
       }
    },
    PARAMETERS = {
       { NAME = "USRPROCColl",
         PARAM_TYPE = COLLECTOR,
         ACTIVE = True,
         MONITOR = False,
         CHECK = False,
         BASE_COMMAND = {
               { COMPUTER_TYPE = "ALL_COMPUTERS",
                 COMMAND_TYPE = "PSL",
                 COMMAND_TEXT = LOAD "usr_proc_collector.psl"
               }
         },
         START = "ASAP",
         POLL_TIME = "600",
         EXTERNAL_POLLING = False
       }
    }
  }
 }
}
!44656
```

```
# PSL Serial No.: 765773959
# usr_proc_collector.psl

# Copyright 1993-94 Patrol Software, Inc. as an unpublished licensed work.
# Copyright 1994 BMC Software, Inc. as an unpublished licensed work.

# The source code created in 1994, is a trade secret which is the property
# of BMC Software, Inc. All use, disclosure, and/or reproduction not specifically
# authorized by BMC Software, Inc., is prohibited.

# This program may also be protected under the copyright and trade secret laws
# of non-U.S. countries. All right reserved.

# Copyright (c) 1993, 1994 Patrol Software
# Copyright (c) 1994 BMC Software, Inc.

# File        : usr_proc_collector.psl
# Author      : H Kusumo
# Platform    : ALL
# Description : The script retrieve user information and
                process information from who and psl process
                function. This script calculate number of user
                login, session, process, as well as average
                process per user
# History
# ---------------------------------------------------------

# ---------------------------------------------------------

ZOMBIE = "<defunct>";

# get machine type
machine_type = get ("/appType");

cmd = "who";

# execute user info command
buf = system (cmd);

# check if buffer is empty or command not found
if (buf = = " ") {
        exit;
}
elsif (index (buf, "not found")){
        print ("SYSTEM:SYSTEM:USRColl: Warning environment is not set properly, switch to sil
        exit;
}
no_session = 0;
# process user information
no_user = 0;
user_list = " ";
foreach entry (buf){
        # get user name
        name = ntharg (entry, 1);

# check if it is root, ignore it
        if (name != "root"){
            no_session ++;

# check if this user is not in the user list
            if (!index (user_list, name)){
                user_list = user_list . name . "\n";
                no_user ++;
```

```
            }
        }
    }
}
# process process information
process_info = process ("*");
no_process = 0;
no_user_process = 0;
no_zombie_process = 0;

foreach entry (process_info){
        # check if this is zombie process
        if (index (entry, ZOMBIE)){
                no_zombie_process ++;
        } if (ntharg (entry, 3) != "root"){
                no_user_process ++;
        }
        no_process ++;
} calculate average user process
if ((no_user !=0 && (no_user_process !=0)){
        avg_usr_proc = int (no_user_process / no_user);
}
else{
        exit;
} set global variables
set ("/SYSTEM/SYSTEM/usrNoUser", no_user);
set ("/SYSTEM/SYSTEM/usrNoSession", no_session);
set ("/SYSTEM/SYSTEM/usrAvgUsrProc", avg_usr_proc);
set ("/SYSTEM/SYSTEM/procNumProcs", no_process);
set ("/SYSTEM/SYSTEM/procUserProcs", no_user_process);
set ("/SYSTEM/SYSTEM/procNoZombieProcess", no_zombie_process);

# get global parameters
if (exists ("/USERS/USERS")){
        set ("/USERS/USERS/USRNoUser/value", no_user);
        set ("/USERS/USERS/USRNoSession/value", no_session);
        set ("/USERS/USERS/USRUserProcs/value", no_user_process);
        set ("/USERS/USERS/USRAvgUsrProc/value", avg_usr_proc);
} if (exists "/SYSTEM/SYSTEM")){
        set ("/SYSTEM/SYSTEM/SYSNoUser/value", no_user);
        set ("/SYSTEM/SYSTEM/SYSNumProcs/value", no_process);
        set ("/SYSTEM/SYSTEM/SYSAvgUsrProc/value", avg_usr_proc);
} if (exists ("/PROCESS/PROCESS")){
        set ("/PROCESS/PROCESS/PROCNumProcs/value", no_process);
}
```

SYSTEM FOR MANAGING COMPUTER RESOURCES ACROSS A DISTRIBUTED COMPUTING ENVIRONMENT BY FIRST READING DISCOVERY INFORMATION ABOUT HOW TO DETERMINE SYSTEM RESOURCES PRESENCE

RELATED APPLICATIONS

This application is a continuation of application Ser. No. 08/316,034, filed Sep. 30, 1994, now abandoned.

FIELD OF THE INVENTION

This invention relates generally to computer networks. More specifically, the invention relates to a method and apparatus for centrally monitoring and managing the computers, applications and other resources present in a distributed computing environment.

BACKGROUND

The data processing resources of business organizations are increasingly taking the form of a distributed computing environment in which data and processing are dispersed over a network comprising many interconnected, heterogeneous and geographically remote computers. Among the reasons for this approach are: to offload non-mission-critical processing from the mainframe; to provide a pragmatic alternative to centralized corporate databases; to establish a single computing environment; to move control into the operating divisions of the company; and to avoid having a single point of failure. For example, many business entities have one client/server network installed in each regional office, in which a high-capacity computer system operates as the server supporting many lower-capacity desktop computers. The servers in such a business entity are also commonly connected to one another by a higher-level network known as a wide area network. In this manner, users at any location within the business entity can theoretically access resources present in the company's network regardless of where the resource is located.

The flexibility gained for users with this type of arrangement comes with a price, however. It is very difficult to manage such a diverse and widely-dispersed network for many reasons. Servers installed in the wide area network are frequently not all of the same variety. One regional office may be using an IBM machine with a UNIX operating system, while another regional office may be using a WANG machine with a VMS operating system. Also, applications present on the servers throughout the network vary not only in terms of type, but also version number within an application type. Moreover, the applications present are changed frequently by users throughout the network, and failure events in such a network are usually difficult to catch until after a failure has already occurred.

Therefore, a need exists for a network management system that will provide an increase in automation and efficiency for network management and a decrease in the complexity of such management. Also, a need exists for a solution that is easy to implement and maintain as installed applications and computers change.

SUMMARY OF THE INVENTION

The invention is a novel method and apparatus for managing a computer network. The method is intended to be used in any distributed computing environment in which two or more computer systems are connected by a network, including environments in which the networked computers are of different types. A manager software system is installed on and runs on one of the networked computer systems designated as the network management computer system. The network management computer system acts as a central console for managing the entire network. An agent software system is installed on and runs on each of the other computer systems in the network. Each respective agent software system carries out tasks on the computer system in which it is installed, such as discovering which resources and applications are present on that computer system, monitoring particular aspects of the resources and applications present on that computer system, and executing recovery actions automatically when such actions are warranted. Each agent also carries on a dialog of communication with the manager software system via the network, so that the central console on the network management computer system can provide a continuously updated display representing all resources and applications present throughout the network, as well as the state of each such resource or application. A knowledge module is installed on the central network management computer system, and then that computer system distributes knowledge throughout the network to the agent software systems. Such knowledge allows the agent software systems to operate in a semi-autonomous and automatic manner, relieving burdens from the central console operator. Also, the agent software systems make use of script programs written in a high-level interpretable language in order to execute certain procedures. Thus, only one agent software system need be installed on each server. As needs for agent software functionality changes or increases over time with changes in the network, new script programs may be developed and distributed throughout the network to customize the agent software systems instead of replacing, modifying or duplicating the agent software systems themselves.

BRIEF DESCRIPTION OF THE DRAWINGS

FIG. 4 is a diagrammatic illustration of the types of information that are preferably stored in a knowledge module.

FIGS. 5a and 5b comprise an exemplary listing of portions of an actual knowledge module.

FIGS. 6a and 6b comprise an exemplary listing of portions of an actual script program.

DETAILED DESCRIPTION OF THE DRAWINGS

The components of the preferred apparatus for implementing the invention will now be described in detail with reference to FIGS. 1–6. Note that the word "resource," wherever it is used in this specification, is intended in its broad sense to include, without limitation, hardware such as computers, printers, memory or other network devices, applications such as database management systems, and logical devices such as logical disk drives or filing systems. Note also that the words "agent" and "manager" refer to the agent software system and the manager software system, respectively.

Figure 1:
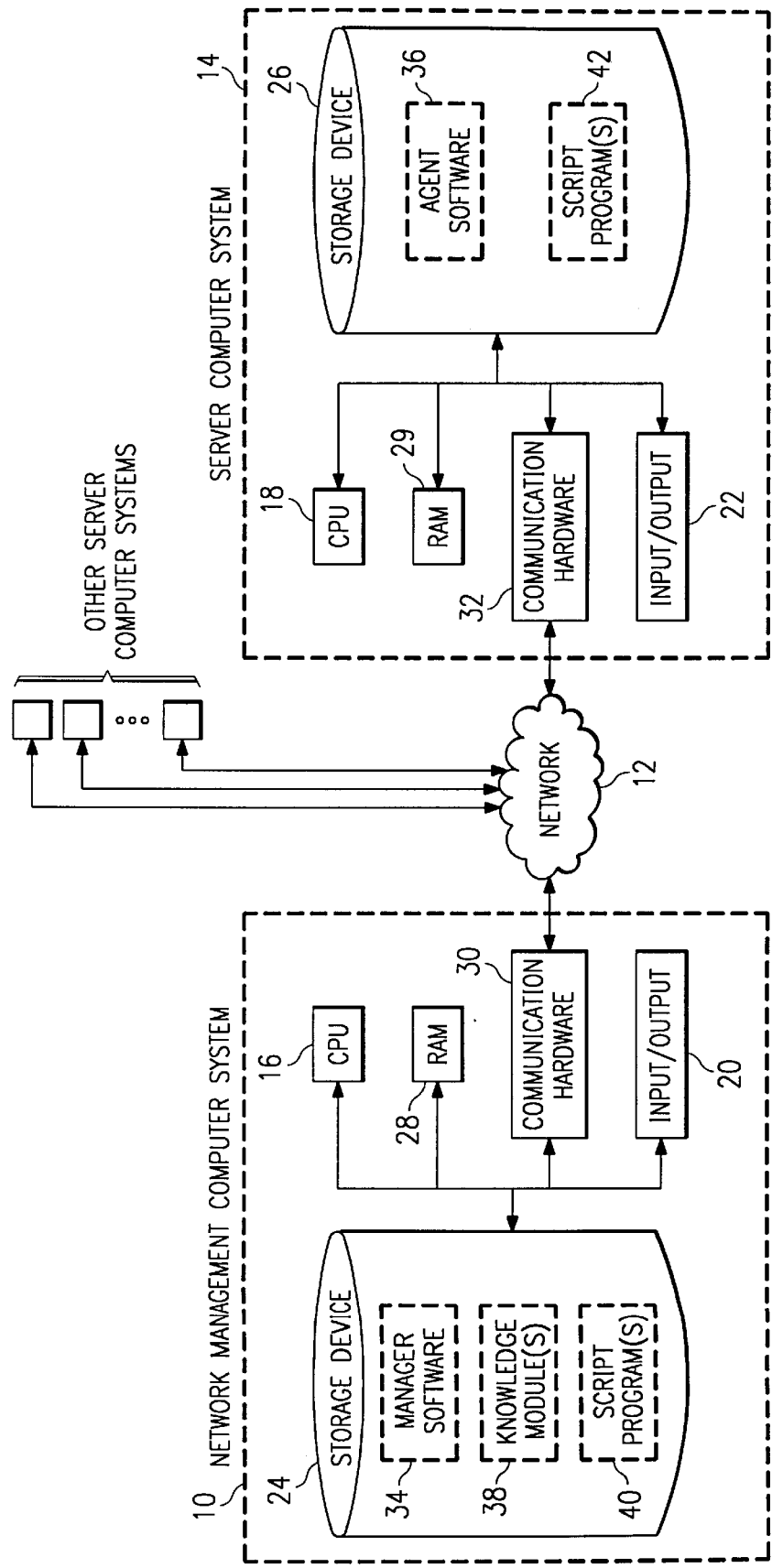
FIG. 1 is a block diagram of a computer network configured to implement the method of the invention in a preferred manner.

FIG. 1 illustrates a computer network configured to implement the method of the invention. A network management computer system 10 is coupled via network 12 to server computer system 14 and a plurality of other server computer systems. The hardware present in each of the computer systems may be of any conventional type such as is typically found on server computers in a client/server network environment. Moreover, the hardware configuration of each of the computer systems need not be the same. For example, network management computer system 10 might be built around a computer sold by International Business Machines Corporation operating with the well-known UNIX operating system, while server computer system 14 might be built around a computer sold by Wang Corporation operating with the well-known VMS operating system. The other server computer systems in the network might be built around yet other platforms. In addition, all of the server computers in the network might be coupled to a variety of supported client computers such as desk-top computers and perhaps other resources. It is anticipated, however, that network management computer system 10 and each of the server computer systems in the network will be equipped with some sort of CPU 16, 18, some sort of conventional input/output equipment 20, 22 such as a keyboard and a display monitor, some sort of conventional data storage device 24, 26 such as a disk or tape drive or CD ROM drive, some sort of random access memory ("RAM") 28, 29, and some sort of conventional network communication hardware 30, 32 such as an ETHERNET interface unit for physically coupling the computer system to network 12. Network 12 may be implemented using any conventional network protocol such as TCP/IP. In order to implement the method of the invention, however: a manager software system 34 should be stored on storage device 24 in network management computer system 10; and one agent software system should be installed on each of the server computer systems in the network, such as agent software system 36 shown stored on storage device 26 in server computer system 14; at least one knowledge module 38 should be stored on storage device 24 in network management computer system 10; and at least one script program 40, 42 should be stored on each of the storage devices 24, 26 throughout the computer network.

Figure 2:
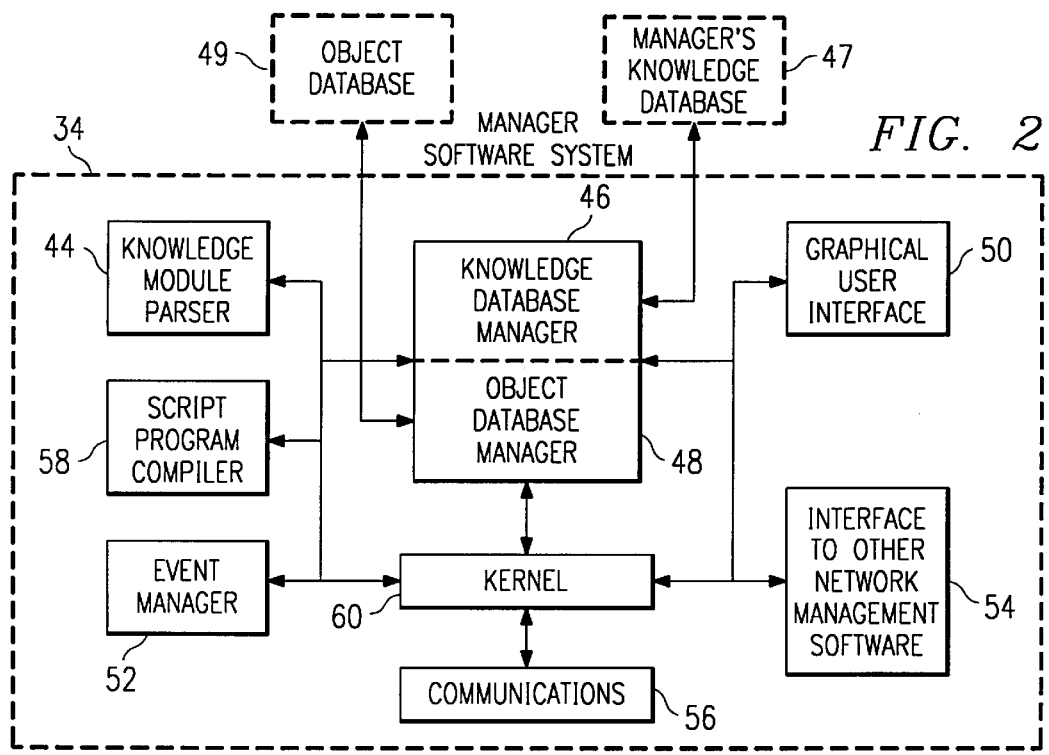
FIG. 2 is a block diagram showing the preferred components of a manager software system for implementing the method of the invention.

FIG. 2 illustrates the preferred main components for implementing manager software system 34. Knowledge module parser 44 is responsible for accessing knowledge module 38 and parsing the information therein for use by knowledge database manager 46, which in turn creates and maintains a database 47 of knowledge that is more readily useable by manager software system 34 than would be the data stored in knowledge module 38. Object database manager 48 creates and maintains a database 49 representing all of the resources and applications (collectively, "objects") present on the computer network, as well as information pertaining to the state of those objects, in a form that will be readily useable by graphical user interface module 50. Databases 47 and 49 may be stored in RAM or on a storage device such as a hard disk. Graphical user interface 50 is responsible for communicating with display driver software in order to present visual representations of objects on the display of network management computer system 10. Such representations typically take the form of icons for objects. Also, graphical user interface module 50 coordinates the representation of pop-up windows for command menus and the display of requested or monitored data. Event manager 52 is responsible for keeping a record of various occurrences throughout the computer network, such as the occurrence of alarm conditions and their resolution, for the purpose of record keeping and management convenience. Interface 54 is for the purpose of interfacing with network management software other than the manager software system 34 and agent software system 36. For example, users of network management computer system 10 may make use of software such as Hewlett Packard Corporation's OPENVIEW product for the purpose of monitoring low-level network conditions such as broken physical connections. While using such a third-party product, the user may open a window and request information from manager software system 34, in which case interface 54 will coordinate communication between manager software system 34 and such third party product. Communications module 56 is responsible for handling all communications to and from agent software systems installed throughout the computer network. Script program compiler 58 is used when the user of manager software system 34 wishes to develop script programs for use in managing a computer network according to the method of the invention. Kernel 60 represents all other miscellaneous functions within manager software system 34, such as coordinating the action of the above-named modules and the communications between them.

Figure 3:
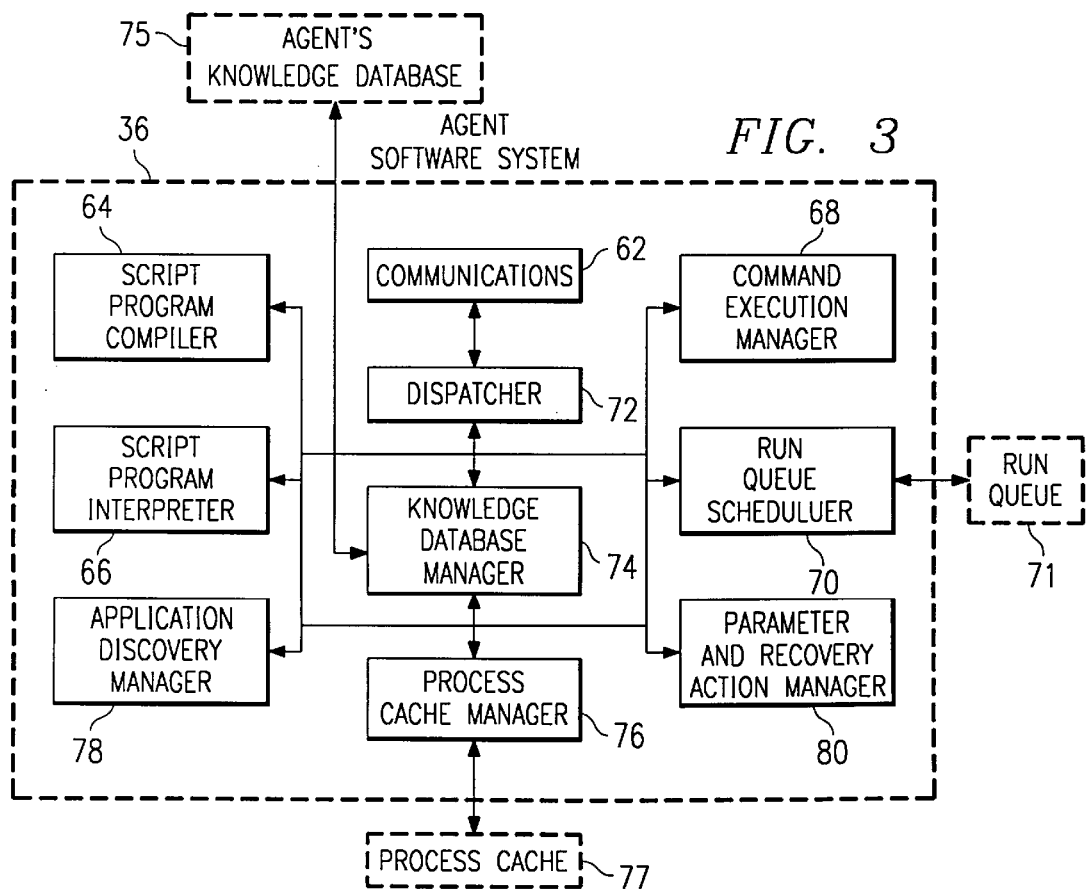
FIG. 3 is a block diagram showing the preferred components of an agent software system for implementing the method of the invention.

FIG. 3 illustrates the preferred main components of agent software system 36, and is representative of all such agent software systems installed throughout the computer network; provided, however, that before physically installing an agent software system on a particular server computer in executable form, the agent software system must of course be ported for the particular machine in question. Communications module 62 coordinates message communications to and from other computers, such as network management computer system 10, and parses the information contained in such messages. Script program compiler 64 is responsible for compiling script programs. Such compilation is only partial, however, resulting in an intermediate code that is not directly executable, but that is interpretable by script program interpreter 66. Command execution manager 68 is responsible for coordinating the execution of commands dictated from within agent software system 36 by any of its components. Depending on the command type, executions of such commands may entail the use of operating system commands available on the host server computer, or such commands may entail the interpretation of script programs as win be further described below. Run queue scheduler 70 maintains a list of runnable jobs or commands, together with the times at which they should be run and their desired frequency. By checking a timer within agent software system 36, run queue scheduler 70 is capable of "waking up" at appropriate times to route runnable jobs or commands to command execution manager 68. Dispatcher 72 is responsible for routing information to and from the appropriate modules within agent software system 36, and generally performs a coordinating function similar in nature to that of kernel 60 in manager software system 34. Knowledge database manager 74 creates and maintains a database 75, either in RAM or on a storage device such as a hard disk, containing knowledge received via messages from manager software system 34. The knowledge maintained in agent's database 75 differs from the knowledge contained in manager's database 47, however, in that agent's database 75 typically does not contain information pertinent to the display of information on the manager's console. Process cache manager 76 creates and maintains process cache 77, which is typically stored in RAM. Agent software system 36 fills process cache 77 periodically with information concerning the processes that are present on the host server computer at any given moment. Process cache 77 is also accessed by other modules within agent software system 36, such as application discovery manager 78, for providing some of the input information used to determine whether certain resources are present on the host server. Parameter and recovery action manager 80 is responsible for monitoring certain aspects of resources on the server computer, such as "disk space remaining," for example, and is responsible for taking automatic actions to recover from alarm levels for such resources, as will be discussed below.

FIG. 4 is a diagrammatic illustration of the types of information that would typically be stored in a knowledge module 38 and in knowledge databases such as databases 47 and 75. (Note that knowledge module 38 is preferably stored in the form of a data file containing ASCII text.) There are two basic broad categories of information represented in a knowledge module. Category 92 comprises information related to computers that may be present on any given network. Category 92 includes information in categories 82, 84 and 86. Category 94 comprises information related to applications that might be present on the computers in any given network. Category 94 includes information in categories 88 and 90. As can be seen in categories 82 and 88, various types of information may be stored in a knowledge module, such as information relating to environment, parameters, command types, commands, setup commands, "infobox" commands, and discovery. For example, environment information would include values for environment variables that would be used to execute certain commands. Parameter information would pertain to certain aspects of a computer or application that are to be monitored, such as "number of users logged in." "Command type" information would tell an agent software system how to execute a given command. ("Command type" information might indicate that a given command is type "operating system," or type SQL, or that the command is actually a script program.) "Command" information proper, is associated with the definition of a command, i.e., the text of the actual command, and would contain information displayed in a command menu at the network manager's console. Setup commands are those that are to be executed whenever the manager software system 10 establishes a connection with an agent software system 36. Infobox command information relates to the format for displaying command output in "pop-up" information windows at the manager's console. Discovery information relates to which application classes are desired to be searched for, and also to the names and locations of the script programs required to do the searching.

Note that, in knowledge module 38, the above categories of information are arranged in a hierarchy, such that information in category 82 will apply to all computers (for example, IBM and WANG computers), unless overridden by information in category 84 or 86. By the same token, information in category 84 would apply to all instances of a given class of computers (for example, all computers using the UNIX operating system), unless overridden by information in category 86. Information in category 86 would apply only to certain instances of computers in a given class. (For example, the UNIX computers at the Dallas and Houston nodes in a wide area network would represent two different instances within the UNIX computer class.) Similarly, categories 88 and 90 represent a hierarchy of information: Information in category 88 would apply to all applications in a given class of applications, unless overridden by information in category 90 pertaining to a specific application instance within the class. (For example, one application class might contain information relating to all instances of version 7 of Oracle Corporation's ORACLE database management system, while another class might contain information relating to all instances of version 6 of that company's database management system.) Information in category 90 would apply only to certain instances of the applications in a class, for example the ORACLE 7 database present on a certain server computer system within the network.

Preferably, only information types pertinent to a particular server will be sent by management software system 10 to the agent software system 36 installed on that server, but such pertinent information might include information from all of the above categories.

By way of example, FIG. 5a, which is continued in FIG. 5b, is an excerpt from an actual knowledge module 38. The syntax used in the example is a matter of convention only. Any syntax may be used to delineate necessary structure within the text file that comprises the knowledge module, and is best left to the preference of the implementer.

By way of further example, FIG. 6a, which is continued in FIG. 6b, is an excerpt from an actual script program such as would be typical for script programs 40 and 42. Script programs are written in an interpretable language, and are stored in network management computer system 10 and server computer system 14 in their uninterpreted form (preferably in the form of an ASCII text file). In a preferred embodiment of the invention, a script language was defined such that it could be partially compiled according to conventional methods into an intermediate form. Interpretable languages that are capable of being compiled into such an intermediate form may be interpreted more quickly than languages that must be interpreted from ASCII text. Thus, for example, preferably when a script program 42 is used for the first time by agent software system 14, it is compiled and interpreted. Thereafter, the compiled version of script program 42 is stored so that the next time it is required it may simply be interpreted from its intermediate form rather than being compiled again.

As can be seen from the example, a script program written in an interpretable language can be used to define a command or routine, such as (in this example) a routine for collecting information and determining the number of users logged into a particular server computer system 14 as well as the number of processes per user. The implementer may define his or her own syntax and script program language for this purpose without undue experimentation. Preferably such a language definition should embody the following features: The language defined should be able to (1) execute external commands, (2) access system files, (3) communicate information about the existence and status of resources, (4) allow the exchange of information between processes, and (5) query and update a knowledge database such as databases 47 and 75.

The operation of the method and apparatus of the invention will now be described with reference to FIGS. 7–10, which Figures depict exemplary procedures that take place according to the method of the invention in a computer network configured like that shown in FIG. 1 and described in detail above.

Figure 7:
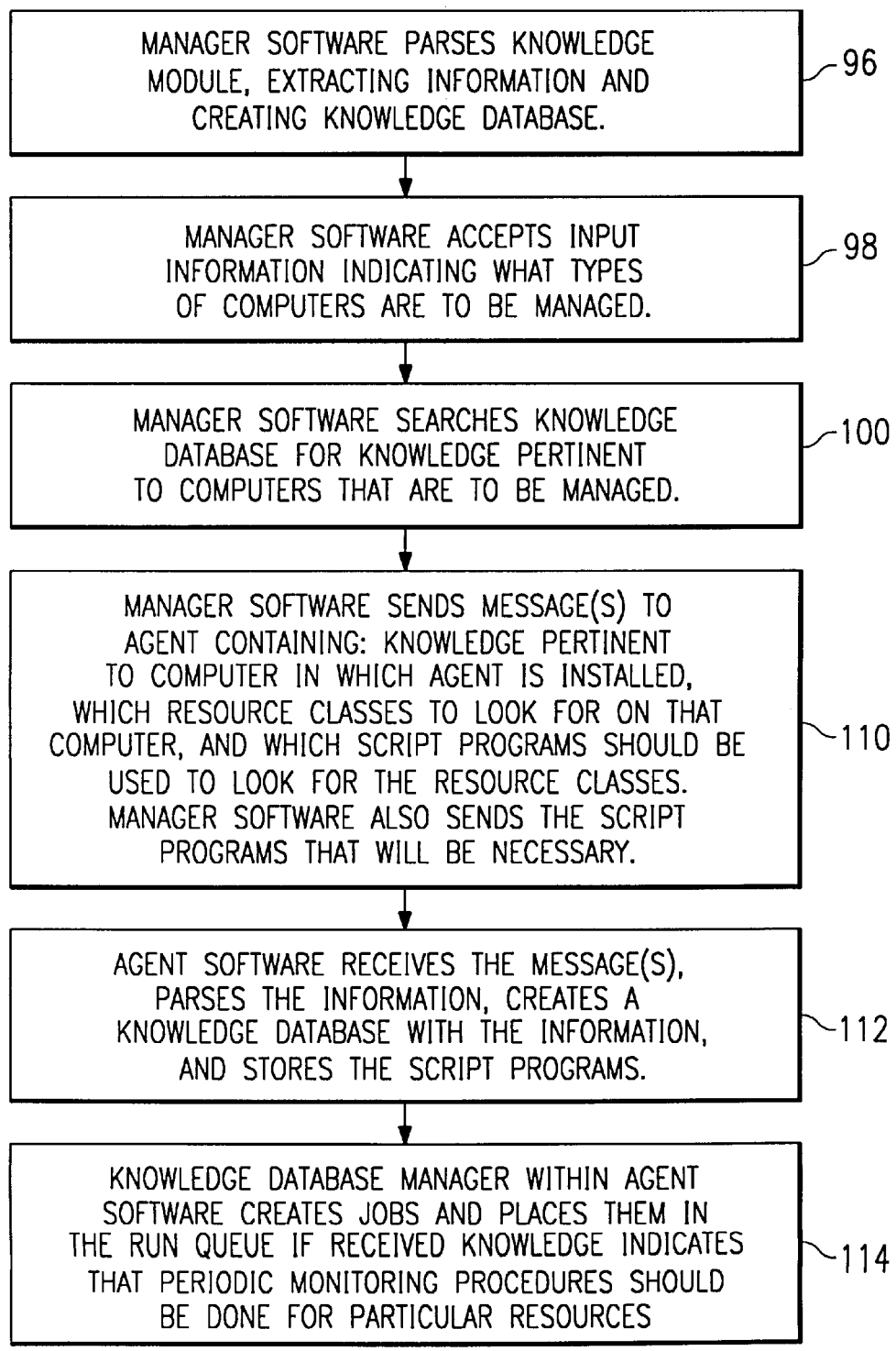
FIG. 7 is a flow diagram illustrating a preferred procedure for initializing a network for operating according to the method of the invention.
Figure 8:
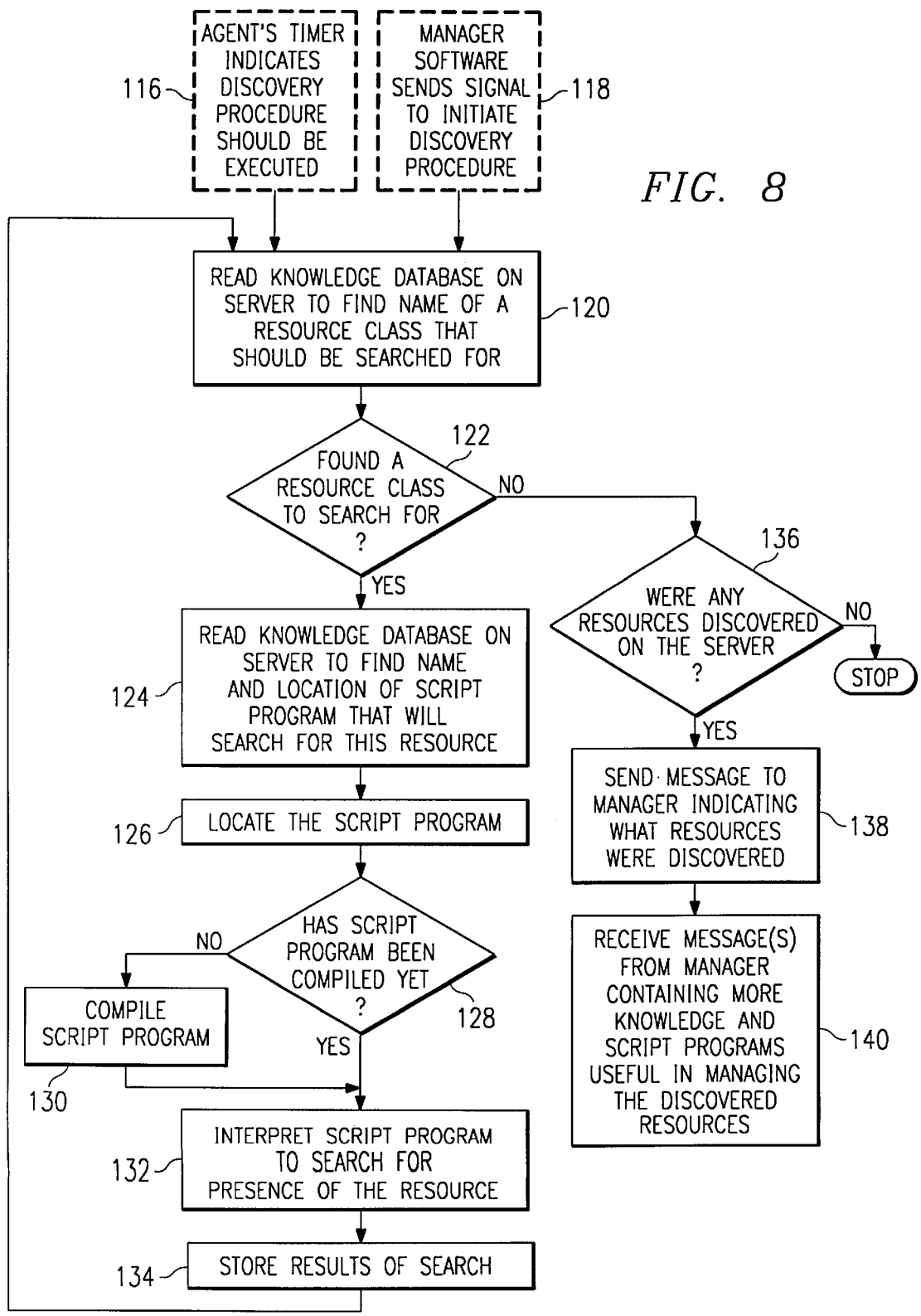
FIG. 8 is a flow diagram illustrating a preferred procedure for discovering resources according to the method of the invention.
Figure 9:
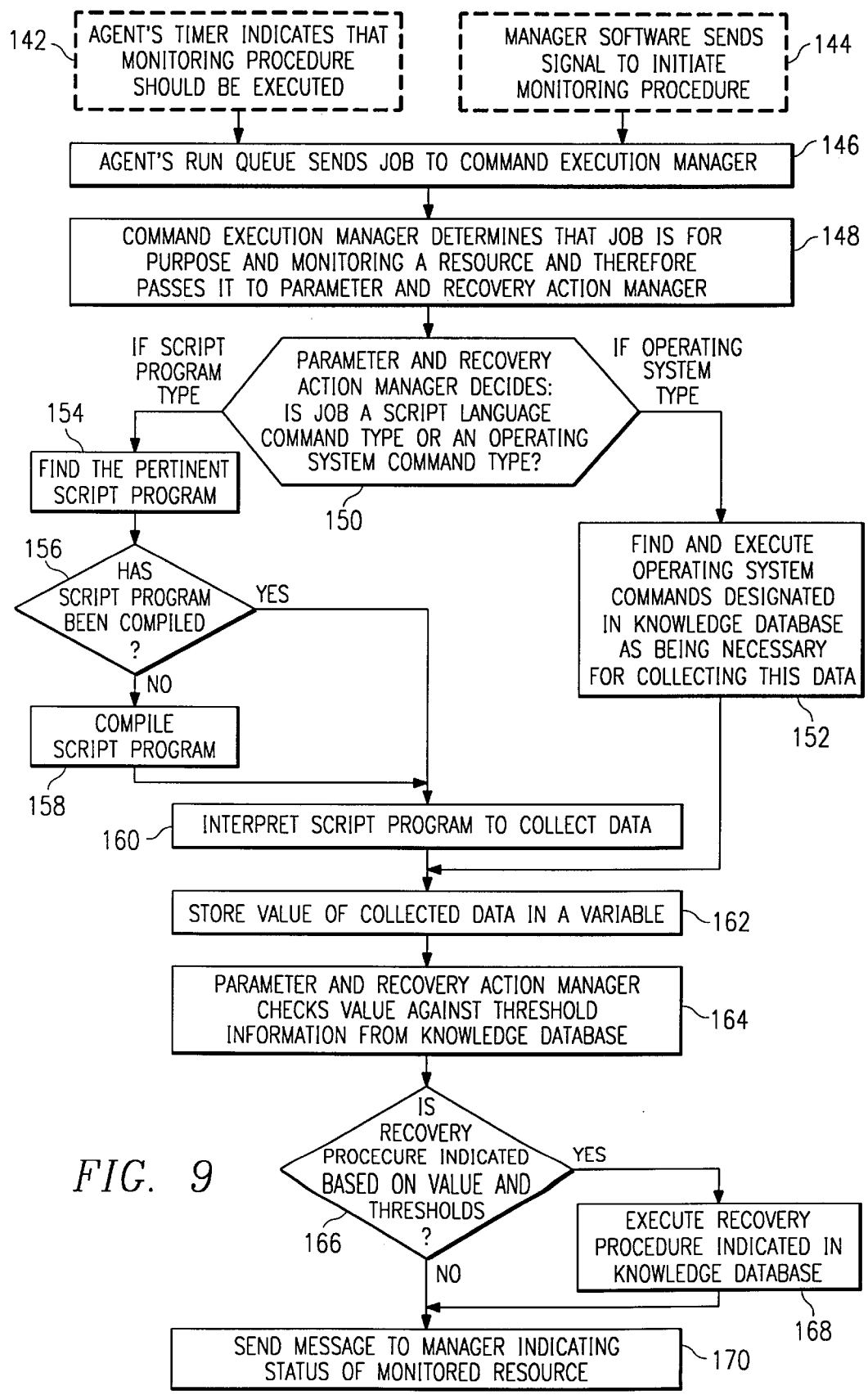
FIG. 9 is a flow diagram illustrating a preferred procedure for monitoring resources according to the method of the invention.
Figure 10:
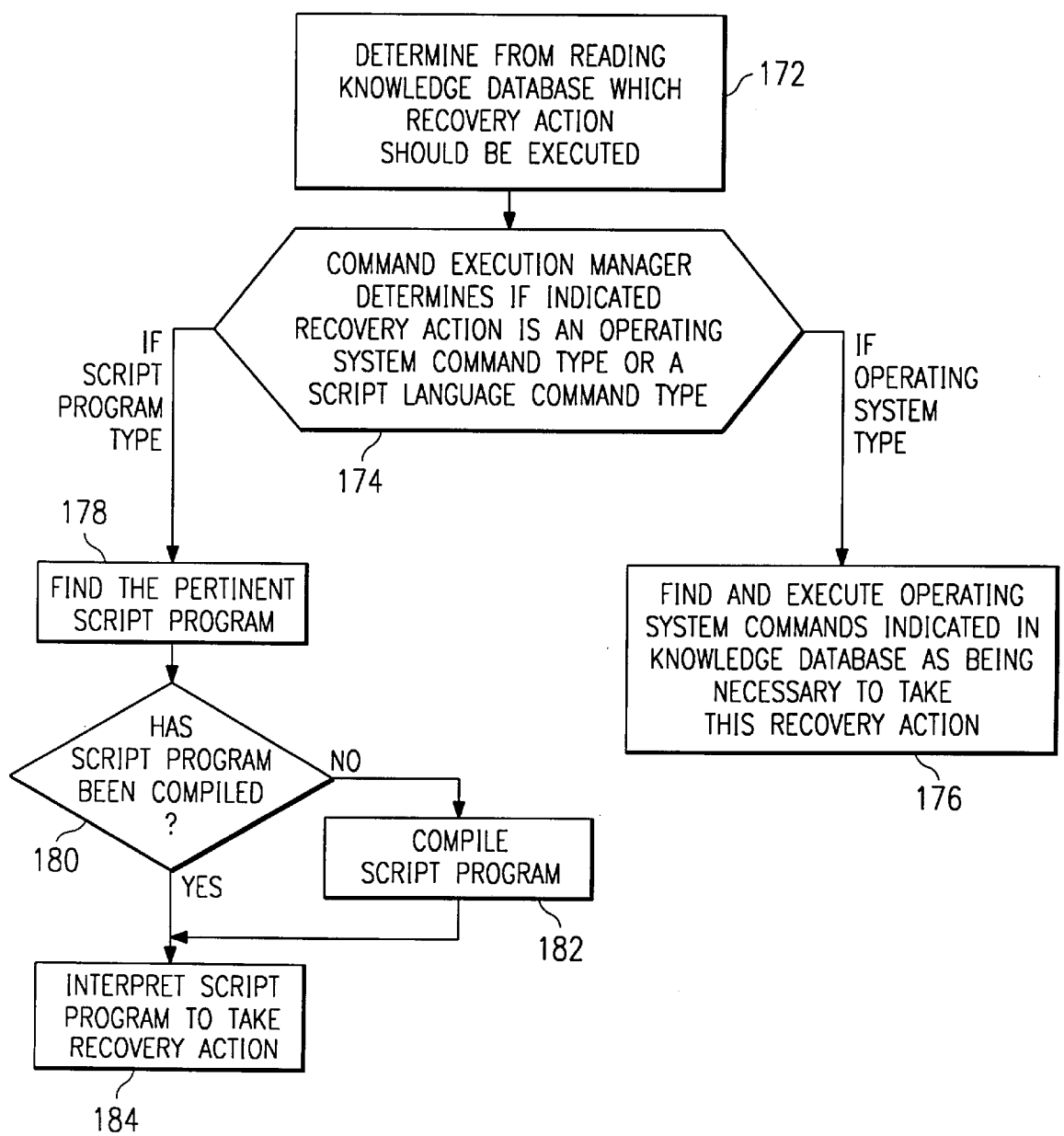
FIG. 10 is a flow diagram illustrating a preferred procedure for executing recovery actions according to the method of the invention.

FIG. 7 shows an initialization-type setup procedure that preferably is executed prior to executing the procedures of FIGS. 8–10. In step 96, manager software 34 parses through knowledge module 38, extracting information therefrom to create knowledge database 47. Knowledge database 47 may be implemented in RAM or on a suitable read/write storage device. In step 98, manager software 34 accepts input from the user at the network management computer system console. This information indicates what types of computers are present throughout the network. In turn, this information indicates to manager software 34 what types of computers are to be managed. In step 100, manager software 34 searches the knowledge database 47 to determine what knowledge therein will be pertinent to the computers so entered. In step 110, manager software 34 begins to send messages to the various agent software systems 36 throughout the network. These messages contain knowledge that will be pertinent and useful for agent software systems 36 to use in carrying out their respective tasks in network management. The messages contain knowledge pertinent to the computer on which the agent software system is installed, which resource classes the agent is to look for on its host server, and which script programs should be used to look for those resource classes. If necessary, the manager software 34 also sends the script programs themselves that will be necessary to discovery the resource classes indicated. In step 112, agent software system 36 receives the messages sent in step 110 and parses the information, creating a knowledge database of its own on the server on which it is installed. Also in step 112, the agent software stores any script programs sent by the manager software system 34. In step 114, the knowledge database manager 74 in agent software system 36 creates an agent knowledge database 75. This knowledge database may be implemented in RAM or on a suitable read/write storage device. In addition, knowledge database manager 74 determines whether the knowledge stored in the created knowledge database indicates that periodic monitoring procedures are to be executed relating to particular resources. If so, knowledge database manager 74 creates appropriate job descriptions and places them in run queue 71 so that run queue scheduler 70 may initiate those processes at the appropriate times.

FIG. 8 shows a preferred procedure, implemented according to the method of the invention, for discovering resources on a server computer system 14 in the network using a high-level interpretable language. The discovery procedure is initiated either in step 116 when the timer within agent software system 36 indicates that a discovery procedure stored in run queue 71 is ready to be executed, or in step 118 when manager software system 34 sends a message to agent software system 36 indicating that a discovery procedure should be executed. (Note that the "timer" within the agent software system is a function contained within run queue scheduler 70.) When the discovery procedure begins, in step 120, the agent software system 36 reads knowledge database 75 to determine the name of a resource class that should be searched for. In step 122, if a resource class is found that should be searched for, execution continues with step 124. In step 124, the knowledge database on the server is read to find the name and location of the script program that will search for the particular resource in question. In step 126, the script program indicated is found. In step 128, agent software system 36 determines whether or not the script program has yet been compiled. If not, script program compiler 64 compiles the script program in step 130 and execution continues with step 132, in which the script program is interpreted, thereby searching for the presence of the resource in question. The results of the search are stored in step 134, and the process continues at step 120 once again until in step 122 no further resources are found to be searched for, in which case execution continues with step 136. In step 136, if no resources were discovered on the server, then no message is returned to management software 34. If, however, resources were discovered, then execution continues with step 138 in which agent software system 36 sends a message to manager software system 34 indicating what resources were discovered. Finally, in step 140, agent software 36 receives a return message from manager software 34 containing more knowledge and script programs that will be useful in managing the discovered resources.

FIG. 9 shows a preferred procedure for monitoring an aspect of a resource according to the method of the invention using a high-level interpretable language. The monitoring procedure, like the discovery procedure of FIG. 8, may begin in one of two ways. In step 142 the monitoring procedure begins when a timer with an agent software 36 indicates that the monitoring procedure should be executed. Or, in step 144, the monitoring procedure may begin when manager software system 34 sends a message to agent software system 36 indicating that a monitoring procedure should be initiated. The monitoring procedure itself begins in step 146 when run queue 71 in agent software 36 sends the monitoring job to command execution manager 68. In step 148, command execution manager 68 determines that the job presented is for the purpose of monitoring a resource, and therefore passes execution of the job to parameter and recovery action manager 80. Execution continues with step 150 in which parameter and recovery action manager 80 decides whether the job to be executed relates to a script language program, or whether the job represents an operating system command type. If the job is of the latter type, then execution continues with step 152. In step 152, agent software system 36 finds and executes the operating system commands that are designated in the knowledge database 75 as being necessary for collecting the desired data. If, on the other hand, the outcome of step 150 indicates that the job is related to a script program, then execution continues with step 154 in which agent software system 36 finds the pertinent script program in storage on the server. If, in step 156, it is determined that the script program has been compiled previously, then execution continues with step 160. On the other hand, if the script program has not yet been compiled, then, in step 158, script program compiler 64 compiles the script program, and execution continues with step 160. In step 160 the script program is interpreted, thereby collecting the desired data. In step 162, the value of the collected data is stored in a variable. In step 164, the parameter and recovery action manager 80 checks this stored value against threshold information stored in knowledge database 75. In step 166, program execution branches depending on the outcome of step 164. If the threshold checking operation of step 164 indicates that a recovery procedure is indicated, then agent software system 36 will execute whatever recovery procedure was indicated in knowledge database 75 as being appropriate for this threshold condition. Execution completes in step 170 when a message is sent from agent software system 36 to manager software system 34 indicating the status of the resource monitored.

FIG. 10 illustrates a preferred procedure for executing a recovery action according to the method of the invention using a high-level interpretable language. The procedure shown in FIG. 10 may be viewed as a detailed description of step 168 in FIG. 9. The procedure in FIG. 10 begins with step 172 in which the knowledge database 75 is read to determine what recovery action is indicated. Execution continues with step 174 in which command execution manager 68 determines whether the indicated recovery action is an operating system type command or a script language program type command. In the former case, execution continues with step 176 in which agent software system 34 finds and executes whichever operating system commands are indicated in knowledge database 75 as being necessary to take this recovery action. In the case of a script program type command, however, execution continues with step 178 in which agent software system 34 finds the pertinent script program on the server. In step 180, agent software system 34 determines whether the pertinent script program has been compiled. If not, the script program is compiled in step 182 by script program compiler 64. Execution continues with step 184 in which script program interpreter 66 interprets the script program, thereby taking the desired recovery action.

Although this detailed description has been directed to exemplary embodiments of the invention, this description will also suggest various modifications and alternative embodiments to those skilled in the art. For example, the method and apparatus of the invention may be extended to work between the clients and servers on a local area network, as well as between the servers in a wide area network. In any event, the invention encompasses all modifications or alternative embodiments that fall within the scope of the following claims.

We claim:

1. A method of determining whether a resource is present on a computer system, comprising the steps of:
   (a) reading, from a storage device coupled to the computer system, discovery information about how to determine whether the resource is present on the computer system;
   (b) finding, on the storage device, instructions that are referred to in the discovery information, that are written in an interpretable high-level computer programming language, and that are stored on the storage device in their uninterpreted form;
   (c) interpreting the instructions for the purpose of collecting data for use in determining whether the resource is present on the computer system; and
   (d) determining, responsive to the collected data, whether the resource is present on the computer system.

2. The method of claim 1 wherein all of the steps are performed by a software system stored in the computer system and executing thereon.

3. The method of claim 2 wherein the software system is stored in the computer system in a form directly executable by the computer system without interpretation or compilation.

4. The method of claim 3 wherein all of the steps are performed automatically according to a time schedule.

5. A method of monitoring a computer network that includes a network management computer system and a server computer system, comprising the steps of:
   (a) reading, from a storage device coupled to the server computer system, discovery information about how to determine whether a resource is present on the server computer system;
   (b) finding, on the storage device, instructions that are referred to in the discovery information, that are written in an interpretable high-level computer programming language, and that are stored on the storage device in their uninterpreted form;
   (c) interpreting the instructions for the purpose of collecting data for use in determining whether the resource is present on the server computer system;
   (d) determining, responsive to the collected data, whether the resource is present on the server computer system;
   (e) sending a transmission from the server computer system to the network management computer system; and
   (f) displaying, at the site of the network management computer system and responsive to the transmission, an indication of whether the resource is present on the server computer system.

6. The method of claim 5 wherein steps (a)–(e) are performed by an agent software system stored in the server computer system and executing thereon.

7. The method of claim 6 wherein the agent software system is stored in the server computer system in a form directly executable by the server computer system without interpretation or compilation.

8. The method of claim 6 wherein the agent software system employs a high-level interpretable language.

9. A method of monitoring a computer network that includes a network management computer system and a server computer system, comprising the steps of:
   (a) reading, from a storage device coupled to the server computer system, discovery information about how to determine whether a resource is present on the server computer system;
   (b) finding, on the storage device, instructions that are referred to in the discovery information, that are written in an interpretable high-level computer programming language, and that are stored on the storage device in their uninterpreted form;
   (c) interpreting the instructions for the purpose of collecting data for use in determining whether the resource is present on the server computer system;
   (d) determining, responsive to the collected data, whether the resource is present on the server computer system;
   (e) responsive to the determination of step (d), sending a first transmission from the server computer system to the network management computer system, said first transmission containing information about the resource;
   (f) receiving a second transmission from the network management computer system to the server computer system, said second transmission containing information for monitoring or managing the resource; and
   (g) gathering information about the resource responsive to the information contained in said second transmission.

10. The method of claim 9 further including the steps of:
    (h) determining, responsive to a stored threshold and to information gathered in step (f), whether an event has occurred; and
    (i) sending a third transmission from the server computer system to the network management computer system, said third transmission containing information about said event.

11. The method of claim 10 further including the step of executing recovery actions responsive to said event detected in step (h).

12. The method of claim 11 wherein said recovery actions are specified by information contained in said second transmission.

13. The method of claim 11 wherein said recovery actions are specified by information stored on the server computer system.

14. The method of claim 11 wherein said recovery actions are comprised of instructions written in an interpretable high-level computer programming language.

* * * * *